March 14, 1933.  G. W. VEALE  1,901,540
BUMPER
Filed Oct. 31, 1931
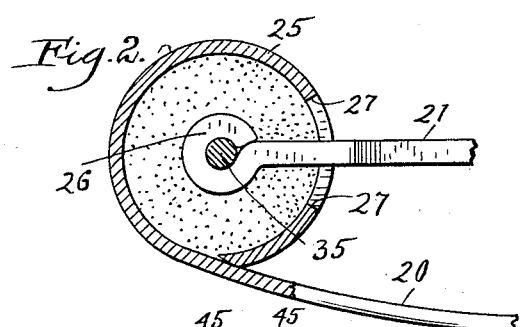
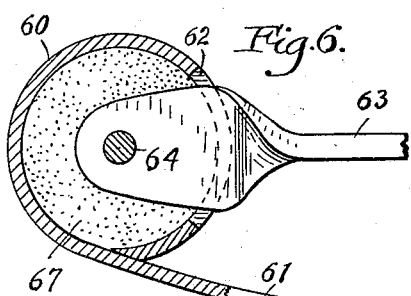
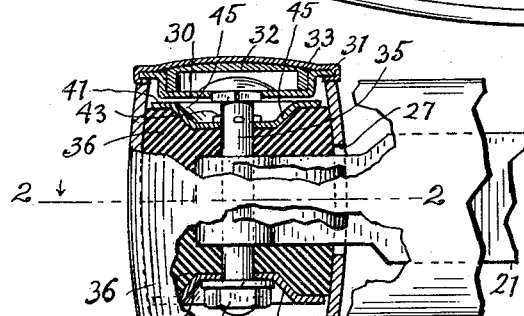
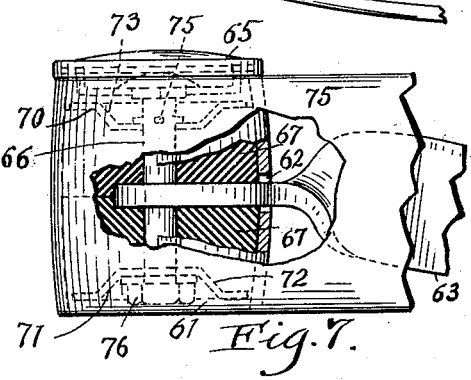
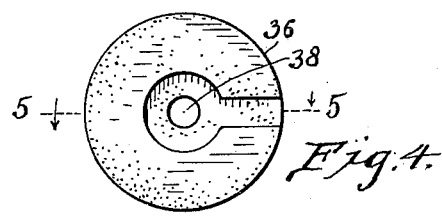
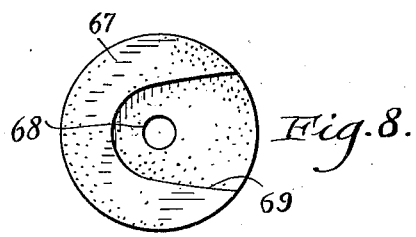
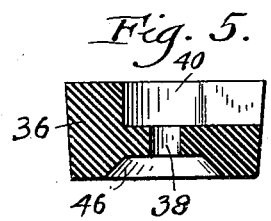
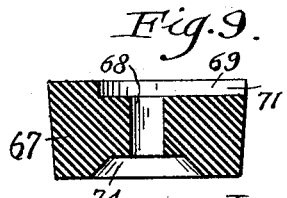
Inventor
George W. Veale
Kwis Hudson Kent
attys.

Patented Mar. 14, 1933

1,901,540

UNITED STATES PATENT OFFICE

GEORGE W. VEALE, OF CLEVELAND HEIGHTS, OHIO, ASSIGNOR TO EATON MANUFACTURING COMPANY, OF CLEVELAND, OHIO, A CORPORATION OF OHIO

BUMPER

Application filed October 31, 1931. Serial No. 572,419.

This invention relates to bumpers for motor vehicles, and particularly to the end construction of bumpers of the single impact bar type.

It is one of the objects of the present invention to provide a single bar bumper capable of withstanding great shock.

A further object of the present invention is to provide a bumper which will present an attractive appearance and which will eliminate rattling.

A still further object is to provide a bumper end construction employing resilient members to connect the bumper bars together.

Other objects of the invention and features of novelty will be apparent from the following description taken in connection with the accompanying drawing, of which Figure 1 is a plan view of a bumper of a type employing my invention;

Fig. 2 is an enlarged plan of the form of end construction shown in Fig. 1, with certain parts shown in section on the line 2—2 of Fig. 3;

Fig. 3 is a front elevation of the end construction shown in Fig. 2 with parts broken away and shown in section;

Fig. 4 is a plan view of one of the rubber blocks used in the form of end construction shown in Figs. 2 and 3;

Fig. 5 is a view taken along the line 5—5 of Fig. 4;

Fig. 6 is a view similar to Fig. 2, but illustrating another form of end construction embodying my invention;

Fig. 7 is a front elevation of the end construction shown in Fig. 6 with parts broken away and shown in section;

Fig. 8 is a plan view of one of the rubber blocks employed in the end construction shown in Fig. 7;

Fig. 9 is a transverse section of the block shown in Fig. 8.

Referring to the drawing, Fig. 1 illustrates a bumper comprising a relatively wide impact bar 20 and a narrower rear bar 21. The rear bar is secured to the usual side members 22 of an automobile, and is curved to meet the front bar as at 23 according to the common practice. The front and rear bars are also secured together at their ends, as at 24, and this invention is directed to novel means for securing these ends together. It should be understood, however, that the invention is not limited to front bumpers but is equally applicable to rear bumpers, nor is it limited to any particular widths or thicknesses of bars, it being possible to vary the proportions of these members if desired.

Referring to Figs. 2 and 3, it will be seen that the front or impact bar 20 is coiled at its end so as to form a relatively large cylindrical portion or eye 25. The end of the rear bar 21 is likewise coiled to form an eye 26, this eye being much smaller that that formed on the front bar. A part of the eye 25 is cut out as indicated at 27, so that the smaller eye 26 can be inserted in the larger eye 25. In the end construction shown in Figs. 2 and 3 the portion of the cylinder 25 adjacent the edges is not cut out and complete cylinders are formed at these points. However, it is equally within the scope of this invention to have the eye 25 slotted from the bottom edge upward, so that a complete cylinder is found only adjacent the top edge of the impact bar. If this latter construction is employed the slot may be narrower than that shown, and the bumper bars can be assembled by sliding the rear bar up in this slot.

A cover is provided for the eye 25, this cover being constructed from a cup-shaped washer 30 having a flange 31 adapted to engage the top of the cylinder 25. A second cup-shaped washer 32 is inserted in the depression in the washer 30 so as to support the thin sheet metal cover 33 which extends over the top of the cover and is crimped under the flange 31. The sheet metal cover 33 may be made of stainless steel or rustless iron, or it may be suitably plated and polished so that it will present an attractive appearance. A bolt 35 is fitted in the cover and extends down through the eye 26, the shank of the bolt being preferably of about the same diameter as the interior of the eye 26.

Resilient blocks 36, preferably of rubber, are placed within the eye 25. The construction of these blocks is illustrated in Figs. 4 and 5, which show a plan view and a sectional view of one of the blocks. These blocks are of such diameter that they will fit snugly in the eye 25. The blocks have a center hole 38, through which the bolt 35 passes, while a portion of one face is cut out as at 40, so that the block will closely surround the eye 26 and the portion of the back bar 21 within the eye 25. Washers 41 and 42 are placed on the bolt 35 above and below the rubber blocks. The bolt 35 has portions struck up from the shank as at 43, which hold the washer 41. If desired these might be omitted and the washer 41 could bear against the cover. The washers 41 and 42 have conical portions 45 and 44, respectively, adjacent their centers which engage corresponding conical depressions 46 in the rubber blocks, so that when the nut 48 is tightened the washers compress the blocks forcing them against the interior of the eye 25, against the exterior of the eye 26 and against the portion of the bar 21 within the eye 25.

The rubber blocks are securely held against both the front and rear bars so that any rotation of the bars relative to each other will be absorbed by torsional flexing of the blocks. Lateral movement of the bars relative to each other is also checked by the blocks, as they surround the eye 26 and the bolt 35 which passes through the eye 26 on the end of the rear bar.

From the foregoing it will be seen that the applicant has provided a bumper end construction having an attractive appearance and which has the bars secured together through resilient blocks so as to eliminate rattling.

A different form of end construction is shown in Figs. 6 and 7. In this modification an eye 60 is formed at the end of the impact bar 61. A narrow slot 62 is cut in this eye adjacent the middle of the eye as may best be seen in Fig. 7. The rear bar 63 is given a half turn or twist adjacent its end, so that it will enter the slot 62 in the eye 60. A cover 65, similar to that shown in Fig. 3, is provided for the eye 60. A bolt 66 is fitted in the cover and extends through the hole 64 in the end of the rear bar.

As in the form of end construction described above, rubber blocks 67 are placed within the eye 60. The blocks which are employed in this form of end construction are shown in detail in Figs. 8 and 9, and are similar to those shown in Figs. 4 and 5, having a center hole 68 and having one face cut out as at 69 so that the blocks will closely surround the end of the rear bar. Washers 70 and 71 are placed above and below the rubber blocks, the washers having conical portions 73 and 72, respectively, which engage corresponding conical depressions 74 in the rubber blocks. The washer 71 engages portions 75 which are struck up from the shank of the bolt 66 so that when the nut 76 is tightened the washers compress the blocks, forcing them against the interior of the eye 60 and against the portion of the rear bar within the eye 60. The rubber blocks are securely held against both the front and rear bars so that any movement of these bars relative to each other will be absorbed by flexing of the blocks.

While I have described and illustrated what I now consider to be the preferred forms of my invention, these forms are susceptible of modification as to details without departing from the spirit of the invention as defined in the appended claims.

Having thus described my invention what I claim is:

1. In a bumper end construction, a front bar having an eye at its end, a slot in the inner side of said eye, a rear bar projecting through said slot, resilient blocks engaging the interior of said eye and the end of said rear bar, a bolt and nut, washers on said bolt, said bolt and nut cooperating to clamp said blocks in position.

2. In a bumper end construction, a front bar having an eye at its end, a slot in the inner side of said eye, a rear bar projecting through said slot, resilient blocks engaging the interior of said eye and the end of said rear bar, and means adapted to secure said blocks in position.

3. In a bumper end construction, an impact bar having an eye at its end, a slot in the inner side of said eye, a rear bar projecting through said slot, the end of the rear bar within said eye having a hole therein, a bolt within said eye, said bolt passing through said hole in said rear bar, a nut on said bolt, yielding means surrounding said bolt and enclosing the end of the rear bar within said eye, said nut and bolt cooperating to compress said yielding means around the end of said rear bar.

4. In a bumper end construction, an impact bar having a slotted eye at its end, a rear bar extending through said slot, the end of said rear bar being coiled to form an eye, resilient members within said first mentioned eye and surrounding said second mentioned eye, a bolt extending through said resilient members and the eye on said rear bar, a nut on said bolt, said nut and bolt cooperating to clamp said resilient members in position.

5. In a bumper end construction, an impact bar, an eye at the end of said impact bar, a slot in the inner side of said eye, a rear bar having an end portion twisted through an angle of approximately 90°, the twisted portion of said rear bar extending through the slot in said eye, said end portion having a hole therein, resilient members within said eye, said members engaging the interior of said eye and the end of said rear bar, a bolt extending through said resilient members and the hole in said rear bar, a nut on said bolt, said nut and bolt cooperating to clamp said resilient members in position.

In testimony whereof, I hereunto affix my signature.

GEORGE W. VEALE.

DISCLAIMER 1,901,540.—*George W. Veale*, Cleveland Heights, Ohio. BUMPER. Patent dated March 14, 1933. Disclaimer filed October 31, 1935, by the assignee, *Eaton Manufacturing Company*.

Hereby enters this disclaimer to claims 1 and 2 of said Letters Patent.

[*Official Gazette November 19, 1935.*]